United States Patent
Busson et al.

(10) Patent No.: US 7,643,634 B2
(45) Date of Patent: Jan. 5, 2010

(54) ELECTRONIC COMPONENT ALLOWING THE DECODING OF SATELLITE DIGITAL TELEVISION SIGNALS

(75) Inventors: Pierre Busson, Grenoble (FR); Pierre-Oliver Jouffre, Grenoble (FR); Bernard Louis-Gavet, Noyarey (FR)

(73) Assignee: STMicroelectronics S.A., Montrouge (FR)

( * ) Notice: Subject to any disclaimer, the term of this patent is extended or adjusted under 35 U.S.C. 154(b) by 842 days.

(21) Appl. No.: 10/814,818

(22) Filed: Mar. 31, 2004

(65) Prior Publication Data
US 2004/0268396 A1 Dec. 30, 2004

(30) Foreign Application Priority Data
Apr. 1, 2003 (FR) .................. 03 04040

(51) Int. Cl.
H04N 7/167 (2006.01)
H04L 25/00 (2006.01)
H04L 27/00 (2006.01)
(52) U.S. Cl. ............ 380/205; 375/216; 455/130
(58) Field of Classification Search ............ 380/205
See application file for complete search history.

(56) References Cited

U.S. PATENT DOCUMENTS

| | | |
|---|---|---|
| 4,162,452 A | 7/1979 | Ash |
| 4,392,249 A | 7/1983 | Matsuura et al. |
| 4,885,801 A | 12/1989 | Hansen et al. |
| 4,894,657 A * | 1/1990 | Hwang et al. ............ 341/158 |
| 5,109,544 A | 4/1992 | Mittel et al. |
| 5,151,769 A * | 9/1992 | Immorlica et al. ......... 257/659 |
| 5,220,164 A * | 6/1993 | Lieber et al. .......... 250/214 VT |
| 5,307,515 A | 4/1994 | Kuo et al. |
| 5,329,319 A | 7/1994 | Sgrignoli |
| 5,450,621 A | 9/1995 | Kianush et al. |
| 5,487,186 A | 1/1996 | Scarpa |
| 5,517,529 A * | 5/1996 | Stehlik ................ 375/316 |
| 5,654,774 A * | 8/1997 | Pugel et al. ............ 725/70 |
| 5,671,220 A * | 9/1997 | Tonomura .............. 370/281 |
| 5,737,035 A | 4/1998 | Rotzoll |
| 5,752,179 A | 5/1998 | Dobrovolny |
| 5,774,799 A | 6/1998 | Croft et al. |
| 5,796,147 A * | 8/1998 | Ono ..................... 257/355 |

(Continued)

FOREIGN PATENT DOCUMENTS

EP 0 481 543 4/1992

(Continued)

OTHER PUBLICATIONS

Poulton, et al., "a 4GSample/s 8b ADC in 0.35um CMOS", ISSCC 2002, pp. 166-457, XP010585513.

(Continued)

Primary Examiner—Nasser G Moazzami
Assistant Examiner—Oscar A Louie
(74) Attorney, Agent, or Firm—Gardere Wynne Sewell LLP

(57) ABSTRACT

An integrated circuit is embodied on a monolithic substrate and incorporates a tuning module of the direct sampling type that is able to receive satellite digital television analog signals composed of several channels, as well as several channel decoding digital modules connected at the output of the tuning module so as to deliver respectively simultaneously several streams of data packets corresponding to several different selected channels.

48 Claims, 4 Drawing Sheets

U.S. PATENT DOCUMENTS

| | | | |
|---|---|---|---|
| 5,825,833 A | 10/1998 | Sakaue et al. | |
| 5,857,004 A | 1/1999 | Abe | |
| 5,953,636 A | 9/1999 | Keate et al. | |
| 6,031,878 A * | 2/2000 | Tomasz et al. | 375/316 |
| 6,101,369 A | 8/2000 | Takahashi | |
| 6,131,023 A * | 10/2000 | Matsuura | 455/301 |
| 6,147,713 A * | 11/2000 | Robbins et al. | 348/555 |
| 6,275,990 B1 * | 8/2001 | Dapper et al. | 725/106 |
| 6,400,416 B1 | 6/2002 | Tomasz | |
| 6,424,074 B2 | 7/2002 | Nguyen | |
| 6,535,766 B1 | 3/2003 | Thompson et al. | |
| 6,549,766 B2 | 4/2003 | Vorenkamp et al. | |
| 6,603,807 B1 * | 8/2003 | Yukutake et al. | 375/222 |
| 6,714,776 B1 | 3/2004 | Birleson | |
| 6,813,484 B1 | 11/2004 | Tolson | |
| 6,885,853 B2 | 4/2005 | Sevens et al. | |
| 6,952,594 B2 | 10/2005 | Hendin | |
| 6,983,136 B2 | 1/2006 | Mason et al. | |
| 7,039,385 B1 | 5/2006 | Hoffmann et al. | |
| 7,054,606 B1 | 5/2006 | Sheng et al. | |
| 7,098,757 B2 | 8/2006 | Avazi et al. | |
| 7,167,694 B2 * | 1/2007 | Khoini-Poorfard et al. | 455/132 |
| 7,177,615 B2 | 2/2007 | Ono et al. | |
| 2003/0053562 A1 | 3/2003 | Busson et al. | |
| 2005/0162040 A1 | 7/2005 | Robert | |
| 2006/0166639 A1 | 7/2006 | Kaiser et al. | |

FOREIGN PATENT DOCUMENTS

| | | |
|---|---|---|
| EP | 481543 A1 * | 4/1992 |
| EP | 1 104 097 | 5/2001 |
| FR | 2 824 986 | 11/2002 |
| WO | WO-00/62532 | 10/2000 |

OTHER PUBLICATIONS

French Search Report, FR 03 04040, dated Sep. 4, 2003.

Nguyen, C. T.-C., Micromechanical Resonators for Oscillators and Filters, 1995 IEEE Ultrasonics Symposium, Proceedings, Nov. 7, 1995, pp. 489-499, XP010157252.

Yamamoto, et al., "Wide Band and Low Supply Voltage ICs for Satellite Tuner Unit", Consumer Electronics, 1992, Digest of Technical Papers., ICCE., IEEE 1992, International Conference on Rosemont, Ilinois, USA Jun. 2-4, 1992, New York, NY, IEEE, Jun. 2, 1992, pp. 190-191, XP010102878.

L. Tan, et al., ISSCC 98/Paper FP 13.1: A 70Mb/s variable-rate 1024-QAM Cable receiver IC with Integrated 10b ADC and FEC decoder, Feb. 6, 1998.

L. Tan, et al., A 70-Mb/s Variable-Rate 1024-QAM Cable Receiver IC with Integrated 10-b ADC and FEC Decoder; IEEE Journal of Solid-State Circuits, vol. 33, No. 12, pp. 2205-2218, dated Dec. 1998.

* cited by examiner

ELECTRONIC COMPONENT ALLOWING THE DECODING OF SATELLITE DIGITAL TELEVISION SIGNALS

PRIORITY CLAIM

The present application claims priority from French Application for Patent No. 03 04040 filed Apr. 1, 2003, the disclosure of which is hereby incorporated by reference.

BACKGROUND OF THE INVENTION

1. Technical Field of the Invention

The present invention relates to the decoding of radiofrequency (RF) transmission channels conveying coded digital information. The invention thus applies advantageously to satellite digital telebroadcasting, for example, as defined in the DVB S (Digital Video Broadcasting-satellite) European specification based on the MPEG transmission standards, and using for example to convey the information, quadrature digital modulation. The invention also relates in particular to tuners, and also to demodulators and to the actual channel decoding processing.

2. Description of Related Art

Television signals originating from a satellite are amplified and converted into a predetermined frequency band (typically 950-2150 MHz) by way of a parabolic dish and a low noise converter which is located at the focus of the parabolic dish. This signal is then dispatched to the input of the tuner of the receiver. The purpose of the tuner is to select the desired channel and to output a baseband signal on the in phase path (I path) and on the quadrature path (Q path). This signal is then converted into a digital signal and demodulated. The channel decoding processing then also comprises a block which distinguishes the zeros from the ones, typically by means of majority logic, then performs the entire error correction, that is to say typically a Viterbi decoding, deinterlacing, Reed Solomon decoding and deshuffling. The channel decoding device outputs packets which are decoded in a conventional manner in a source decoding device in accordance with the MPEG standards so as to redeliver at the output the initial audio and video signals transmitted via the satellite.

At the input of the receiver, the signal received is composed of the collection of channels which are transmitted for the satellite and are transposed into the 950-2150 MHz frequency band. The overall power received is substantially equal to the mean power on a channel increased by ten times the Napierian logarithm of the number of channels. This signal possesses a considerable variation, of the order of 50 dBm.

At present, in receivers as a whole, the signal received at the input is normally filtered by a wideband type filter (whose passband is of the order of several hundred MHz) placed just after the low noise input amplifier, this being so as to avoid the saturation of the subsequent stages of the tuner (especially the controlled gain amplification stages as well as the mixers of the frequency transposition stage).

Furthermore, a first type of solution provides for the low noise amplifier and the wideband filters to be made outside the chip containing the controlled gain amplification stage as well as the frequency transposition stage. These filters, whose cutoff frequencies can be tailored by selecting the desired channel, are then embodied as discrete components such as "varicap" diodes. However, such components are of overly large size which is incompatible with a fully integrated embodiment of the tuner.

Moreover, in this type of solution, not only is the tuner not fully integrated, but it is made on a semiconductor substrate different from the substrate which supports the digital part (or digital domain) of the processing, namely the demodulation and the actual channel decoding. Stated otherwise, the demodulation and the channel decoding are carried out in a separate component from that integrating the tuner. Also, the tuner is generally screened so as to prevent the noise generated by the digital part from interfering in the mixing of the signals of the analog part. Thus, in this first type of solution, a front end device incorporated into a satellite television signals receiver, and capable of performing the tuning, demodulation and channel decoding, comprises several separate electronic components made on different chips.

Another type of solution has been envisaged and is described for example in French Patent Application No. 2,804,986. In this second type of solution, a unique "front end" electronic component is proposed, that is to say one embodied on a single chip, and integrating a radiofrequency tuner, a demodulator and a channel decoder.

It is turning out to be beneficial nowadays to be able to simultaneously output from the receiver several, that is to say at least two, MPEG data streams, corresponding respectively to different channels.

Now, if the first hardware solution mentioned above is adopted, such a receiver would then be composed of several identical elementary receivers, thereby leading to the production of a large number of different chips, so as to be able to incorporate the various different electronic packaging of each of the elementary receivers. This results in an increase in cost and a very considerable surface area.

If the second solution alluded to hereinabove is adopted, that is to say a unique electronic component, embodied on a single chip, it would then be necessary to produce on this unique chip, several completely separate tuners, capable of being controlled individually so as to select the various desired channels intended to be delivered simultaneously at the output of the receiver. However, embodying several completely separate tuners on one and the same chip would then lead to problems of coupling between the various voltage-controlled oscillators that are intended to generate the various mixing signals.

Thus, currently, the person skilled in the art, who wishes to produce a receiver of satellite digital television signals that is capable of simultaneously delivering several MPEG streams corresponding to several different channels, is confronted with a choice between two unsatisfactory solutions. Specifically, the first solution leads to the production of several different receivers produced on a considerable number of different chips, this being penalizing from a surface area and cost point of view. The other solution, more beneficial from a surface area point of view, poses technological problems of stray coupling.

There exists a need in the art for a solution to the foregoing problem.

SUMMARY OF THE INVENTION

The invention proposes the production of a satellite digital television signal receiver that is fully integrated onto a single chip and that circumvents the stray coupling problems alluded to above.

In accordance with an embodiment of the invention, an electronic component comprises an integrated circuit embodied on a monolithic substrate and incorporating a tuning module of the direct sampling type able to receive satellite digital television analog signals composed of several channels, as well as several channel decoding digital modules connected at the output of the tuning module so as to deliver respectively simultaneously several streams of data packets corresponding to several different selected channels.

Stated otherwise, an embodiment of the invention provides for the use of a tuner of the direct sampling type, that is to say one in which frequency transposition and channel selection are performed not in analog, but directly in digital, downstream of the analog/digital conversion stage.

Specifically, the use of a direct sampling tuner for the reception of satellite digital television signals leads to the performing in the analog/digital conversion stage of an oversampling of the signals, that is to say a sampling at a much higher frequency of the working frequency customarily used in digital processing. Thus, this oversampling makes it possible to obtain not only a resolution of several bits on the set of channels contained in the oversampled signal, but also to extract the desired channel with a multibit resolution, and therefore to be able to correctly utilize the information contained in this desired channel.

It then becomes possible to combine with this direct sampling tuner, several channel decoding digital modules associated with the various channels extracted in digital by the tuner.

Furthermore, since the transposition of the signals with the various mixing signals corresponding to the various desired channels is performed entirely in digital, the problem of stray coupling between voltage-controlled oscillators is consequently circumvented.

Generally, the channels extend over a predetermined frequency span, and the analog signals convey digital information coded by digital modulation.

Thus, according to one embodiment of the invention, the tuning module comprises an analog stage receiving the said analog signals, a multibit, preferably greater than or equal to 6 bits, analog/digital conversion stage having a sampling frequency equal to at least twice the said frequency span, and several digital devices for transposing frequencies that are connected to the analog/digital conversion stage and are able to deliver simultaneously respectively several sampled digital signals centered around the zero frequency and corresponding respectively to several selected channels.

Moreover, each channel decoding module comprises a decimator filter followed by an additional digital filter for eliminating information of adjacent channels and an error correction stage for delivering a stream of data packets corresponding to the information conveyed by the channel associated with the sampled digital signal processed by this channel decoding module.

According to one embodiment of the invention, the decimator filter is a low-pass filter whose cutoff frequency is of the order of twice the frequency half-width of a channel. Stated otherwise, the aim of this decimator filter is to lower the sampling frequency in such a way as to bring it to a value compatible with current digital circuit technologies, and it also allows a prefiltering of the signal so as to let through only around two channels, including the desired channel.

Furthermore, the cutoff frequency of the additional digital filter, which is a Nyquist filter, is of the order of the frequency half-width of a channel, this additional digital filter being intended to eliminate the information of adjacent channels.

According to one embodiment of the invention, the component comprises a metal plate glued to the rear surface of the substrate by a conducting glue, this metal plate being intended to be grounded. Thus, the capacitance, of relatively high value, produced between the semiconductor substrate and the metal plate, makes it possible to absorb the high-frequency current spikes.

Moreover, it is particularly advantageous for the elements performing a digital processing to be disposed in a part of the substrate that is insulated from the remaining part of the substrate by a semiconducting barrier having a type of conductivity different from the type of conductivity of the substrate. Stated otherwise, a so-called "triple well" technology is used. This makes it possible, when the semiconducting barrier is biased by a bias voltage different from that supplying the transistors situated in the insulated part of the substrate, to preclude noise on the supply voltage of the transistors being transmitted directly via the substrate to the various analog components of the receiver.

The subject of the invention is also a satellite digital television signals receiver, comprising at least one electronic component as defined hereinabove.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
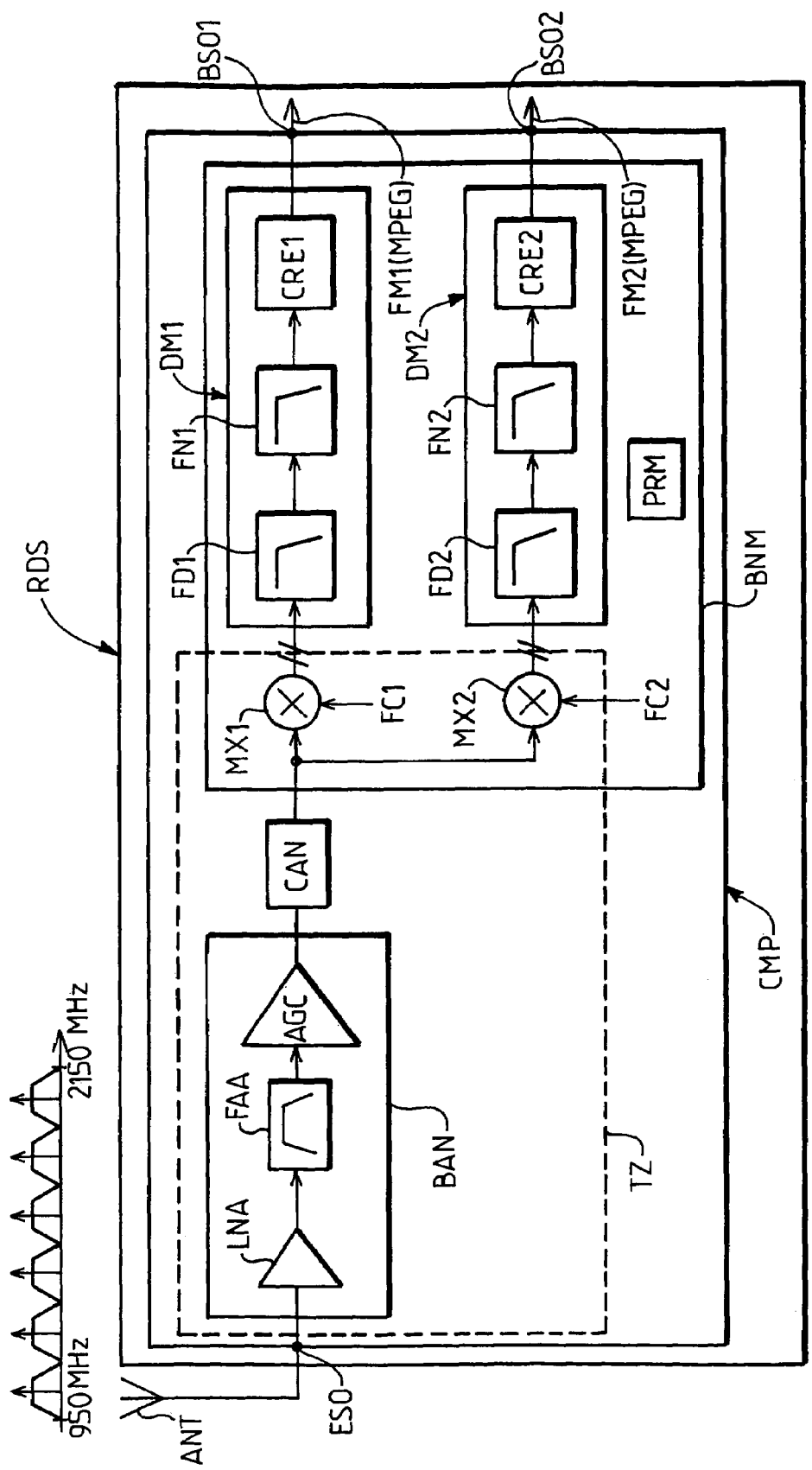
FIG. 1 is a diagrammatic schematic of the internal structure of an electronic component according to the invention.

In FIG. 1, the reference RDS denotes a satellite receiver/decoder ("Set top box") connected to a parabolic antenna ANT picking up radio frequency (RF) digital television signals, and intended to receive and to decode these signals. This receiver RDS comprises at the front end an electronic component CMP intended to receive all the channels CNi present in the signal received at the signal input ESO of this component, and to deliver, simultaneously and in parallel, at the outputs BSO1 and BSO2, two MPEG data streams FM1 and FM2. In FIG. 1, only two outputs have been represented for simplifying purposes. That said, the invention is not limited to this number of outputs, but may comprise more than two thereof.

This component CMP is made entirely in an integrated manner in CMOS technology on a monolithic silicon substrate. The integrated circuit will later be encapsulated in a conventional manner in a package so as to be bonded, for example by welding, to an electronic card.

The component CMP comprises at the front end a tuning device or "tuner" TZ, intended for selecting several desired channels (here two for simplifying reasons) from among all the channels $CN_i$ present in the signal received at the signal input ESO which is also the input of the tuner. This tuner TZ is here a direct sampling tuner according to terminology well known to the person skilled in the art. More precisely, the tuner TZ comprises an analog block BAN and a digital part formed here essentially of digital transposition devices (mixers) MX1 and MX2. The analog part and the digital part are separated by an analog/digital conversion stage CAN.

The analog block BAN of the tuner TZ comprises at the head end a low noise amplifier LNA connected to the signal input ESO. This amplifier LNA is followed by an anti-aliasing bandpass filter FAA. The characteristics of this anti-aliasing filter are chosen in such a way as to guarantee a frequency bandwidth of the signal delivered by the antenna that is compatible with an analog/digital conversion with no spectral aliasing, performed in the stage CAN.

Thus, if the filter FAA is chosen in such a way as to let through the entire useful signal band, that is to say the 950 MHz-2150 MHz radio frequency (RF) band, this corresponding to a bandwidth of around 1.2 GHz, then an analog/digital conversion stage capable of operating at a sampling frequency of at least equal to around 2.5 GHz will be chosen.

In this regard, it will for example be possible to use an analog/digital converter operating at 4 GHz with multibit resolution, such as that described in the article by Ken Poulton et al., entitled "4 GsSample/s 8b ADC in 0.35 µm CMOS," ISSCC 2002/SESSION 10/HIGH-SPEED ADCs/10.1.

Between the anti-aliasing filter FAA and the analog/digital conversion stage is disposed, in conventional manner, a controlled-gain amplifier AGC, an example of the gain control of which will be detailed hereinbelow.

The digital part of the tuner TZ here comprises two transposition means MX1-MX2, both connected to the output of the analog digital conversion stage CAN.

The first transposition means MX1 performs a transposition of the digital signal emanating from the analog/digital converter CAN, using a digital transposition signal having the frequency FC1 corresponding to a first desired channel. Hardware-wise, this transposition is performed digitally by conventional multiplications of the signal by sine and cosine functions having angular frequencies corresponding to the frequency FC1. Thus, two digital paths corresponding to the I and Q paths are obtained at the output of the first transposition means MX1. On each of the two paths I and Q, the signal is a digital signal sampled at the sampling frequency of the analog/digital converter CAN and centered around the zero frequency.

The digital signal is here oversampled (sampling frequency of several GHz), while the sampling frequency after digital filtering is, as will be seen hereinbelow, much lower.

Figure 2:
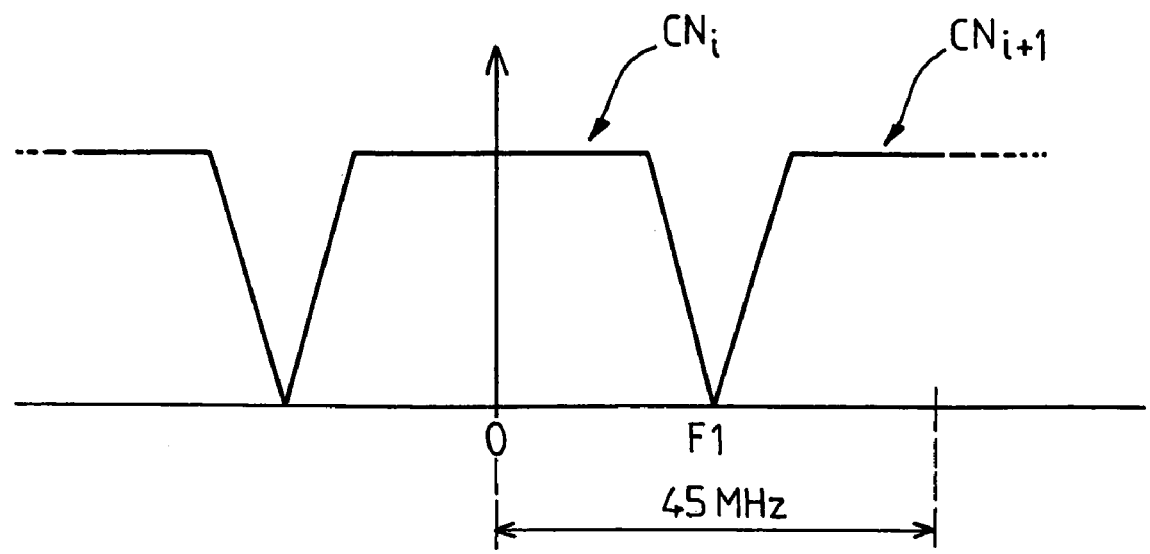
FIG. 2 illustrates a frequency chart of channels after filtering.

FIG. 2 illustrates for example, and for simplifying purposes, at the output of the transposition means MX1, the selected channel $CN_i$ and the immediately adjacent channel $CN_{i+1}$. Of course, although in FIG. 2 the signal represented for simplifying reasons and for clarity is analog, it is of course in fact digital, that is to say formed of samples.

In FIG. 2, the frequency F1, equal to 30 MHz, represents the frequency half-width of the channel $CN_i$. The person skilled in the art is aware that this frequency half-width in fact corresponds to the theoretical frequency half-width of a channel (for example 22.5 MHz) multiplied by a coefficient known by the name "roll off", and which is for example equal to 1.35.

The same operations are performed in the transposition means MX2, with a transposition signal at the frequency FC2 corresponding to a second desired channel.

It is seen therefore that at the output of the transposition means MX1 and MX2, all the power of the signal is recovered, that is to say not only the desired channel, but also all the other channels. Also, by oversampling the signal in the analog/digital conversion stage, it is possible to obtain, at the output of the transposition means, an oversampled signal with a multibit resolution, and this will make it possible to be able to extract, while preserving the multibit resolution, the desired channel, without losing information.

Processing means PRM deliver, on command, the digital transposition signals having the frequencies FC1 and FC2.

Moreover, these digital processing means PRM are also able to deliver the control signal for the controlled-gain amplifier AGC.

In this regard, although several solutions exist for the control of the amplifier AGC, it will advantageously be possible to use that described in French Patent Application No. 2,824,986 in the name of the Applicant.

The main characteristics thereof are recalled here.

In a general manner, the mean overall power of the entire signal received by the tuner can be calculated on the basis of any signal available in the analog block of the tuner. That said, according to one mode of implementation, the calculation of the mean overall power of the entire signal received is performed in the digital block of the tuner, that is to say downstream of the analog/digital conversion stage. This calculation of the mean overall power then comprises for example a calculation of the modulus of the sampled signal as well as a numerical integration over a certain number of samples, typically $2^{21}$. That said, it would be possible as a variant to provide an integrator analog filter in the analog block intended to perform the averaging of the analog signal on the basis of which one wishes to calculate the mean overall power. Then, the output signal from the filter (voltage), representative of the overall mean power of the signal received, would then be sampled in the analog/digital conversion stage. In theory, it would then be necessary to use only a single sample to perform the comparison with the reference value. However, in practice, this comparison would be performed with a mean value calculated over a very limited number of samples, for example 3 or 4.

More precisely by way of example, the digital signal thereof delivered by the analog digital converter is processed in a calculation block of the means PRM which will determine the power of this signal by calculating for example the modulus thereof. A simplified way of calculating the modulus of the signal in the calculation block is provided by the following formula:

$$\text{Module}(S) = \text{Max}(abs(S)) + \tfrac{1}{2}\text{Min}(abs(S))$$

In this formula, Max denotes the maximum value, Min denotes the minimum value and abs denotes the absolute value, S the signal delivered by the analog digital converter.

The output of the calculation block is linked to a subtractor which moreover receives on its other input a reference value, stored for example in a register or a memory. This reference value corresponds to a maximum desired power at a predetermined location of the analog block.

Each sample delivered by the calculation block is in fact representative of the instantaneous power of the signal received at the input of this block. The subtractor in fact compares the instantaneous power of each sample with the reference value. These successive comparison values are then temporally integrated in an integrator with programmable coefficients.

By way of indication, the integration is performed over a sliding window of $2^{21}$ samples and the output of the integrator therefore provides the deviation between the overall mean power of the entire signal received and the reference value. This being so, it would also be possible to perform the integration at the output of the block so as to calculate the mean power of the overall signal, then to subtract the reference value from this mean value. The subtractor would in this case be placed downstream of the integrator.

The output from the integrator is then delivered to means for adjusting the gain of the block BAN. These adjusting means comprise for example a reference table which is decoded by the output of the integrator and which will deliver a digital word whose value will make it possible to fix the gain of the amplifier AGC.

To the outputs of the two transposition devices MX1 and MX2 are connected channel decoding modules DM1 and DM2, comprising conventional demodulation means (not represented for simplifying purposes) and capable of performing conventional demodulation processing (such as a QPSK or 8PSK demodulation according to terminology well known to the person skilled in the art), as well as an error correction stage CRE performing conventional Viterbi decoding processing, deinterleaving, Reed-Solomon decoding, deshuffling, so as to deliver the packet stream FM which will be decoded in a source decoding block external to the component CMP, in accordance with the MPEG standard for example.

Figure 3:
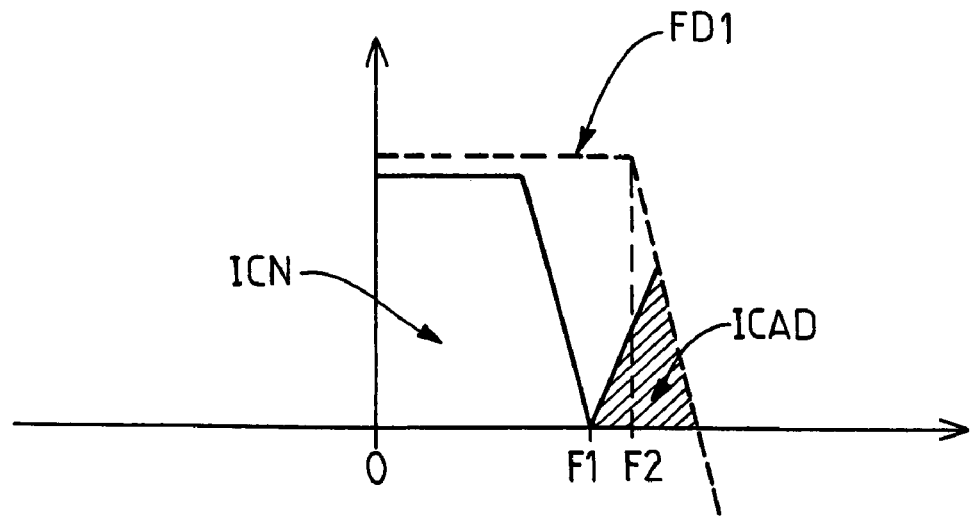
FIG. 3 illustrates a frequency chart of channels after filtering.

Each channel decoding module also comprises at the head end a decimator digital filter FD1, which is a low-pass filter whose cutoff frequency F2 is for example of the order of 40 MHz, thereby making it possible to let through not only information ICN conveyed by the selected channel, but also information ICAD, of so called "adjacent channels", and in practice essentially comprising information relating to the channel immediately adjacent to the one selected (FIG. 3).

Also, the fact of having oversampled the signal in the analog/digital converter makes it possible, at the output of the decimator filter, to obtain a filtered signal sampled at a much lower frequency, for example of the order of 150 MHz, but still with a resolution of several bits.

Each module DMi also comprises correction means ("derotator"), not represented here for simplifying purposes, and able to correct the frequency drift. Such means of "derotation" may for example be those described in European Patent Application No. 0,481,543.

The decimator filter FD1 is supplemented with a Nyquist filter effected in a digital filter FN1, whose cutoff frequency is equal to the frequency half-width of the desired channel. The filter FN1 consequently supplements the filtering performed by the decimator filter and eliminates the information of adjacent channels.

The error correction stage CRE1 then performs the conventional error correction processing well known to the person skilled in the art, by the name "FEC" (Forward Error Correction).

Two MPEG data streams corresponding to the two selected channels are therefore obtained simultaneously on the two outputs BSO1 and BSO2 of the component CMP.

Figure 4:
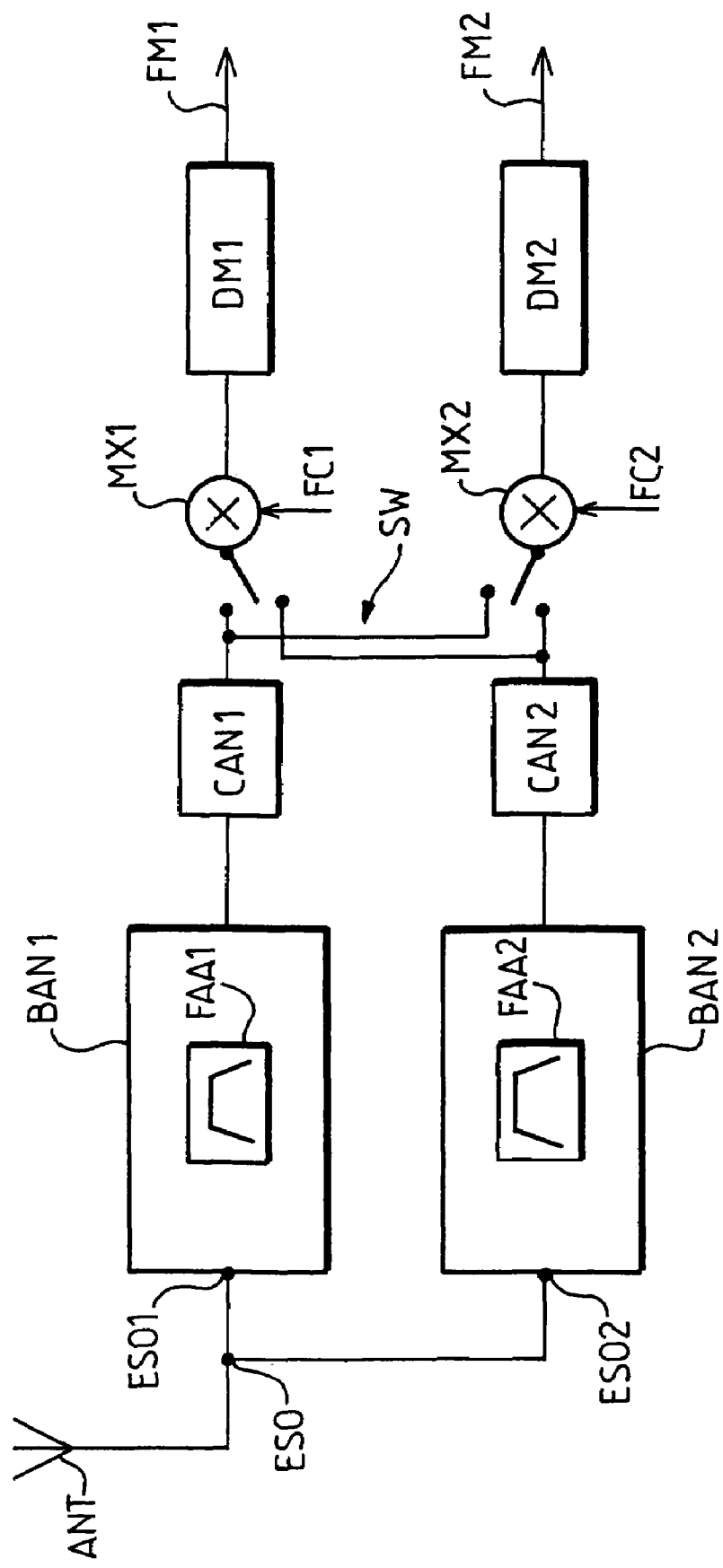
FIG. 4 illustrates a variant embodiment of an electronic component according to the invention.

The embodiment illustrated in FIG. 4, makes it possible to relax the constraints on the analog digital conversion stage. More precisely, in certain applications the use is envisaged of only analog/digital converters operating for example at 2 GHz, for example those described in the article by Xicheng Jiang et al., entitled "2 GS/s 6b ADC in 0.18 μm CMOS," ISSCC 2003/SESSION 18/NYQUIST A/D CONVERTERS/PAPER 18.3, it is then necessary to subdivide the analog block BAN into, for example, two analog blocks BAN1 and BAN2, both linked to the signal input ESO, but which differ from one another by their anti-aliasing filter.

More precisely, it will be possible to choose for example for the filter FAA1, a bandpass filter making it possible to select channels lying between around 950 MHz and 1.5 GHz, and for the filter FAA2, a filter making it possible to select the channels between 1.5 GHz and 2.15 GHz.

These two bandwidths are thus compatible with the 2 GHz sampling frequency used in the analog/digital converters CAN1 and CAN2.

The two transposition devices MX1 and MX2 are then advantageously linked to the outputs of the two analog/digital converters CAN1 and CAN2 by a switching system SW controlled by the processing means PRM.

Thus, if the two desired channels corresponding to the two streams FM1 and FM2 are situated respectively in the passband of the filter FAA1 and in the passband of the filter FAA2, then the two transposition devices MX1 and MX2 will actually be connected to the two analog/digital converters CAN1 and CAN2.

On the other hand, if the two channels are situated in the passband of the filter FAA1, for example, the switching device SW will be configured, in such a way that the two frequency transposition devices MX1 and MX2 are both linked to the output of the analog digital converter CAN1.

Likewise, if the two desired channels are situated in the passband of the filter FAA2, the switching system SW will be configured in such a way that the two transposition devices MX1 and MX2 are linked to the output of the analog/digital converter CAN2.

Figure 5:
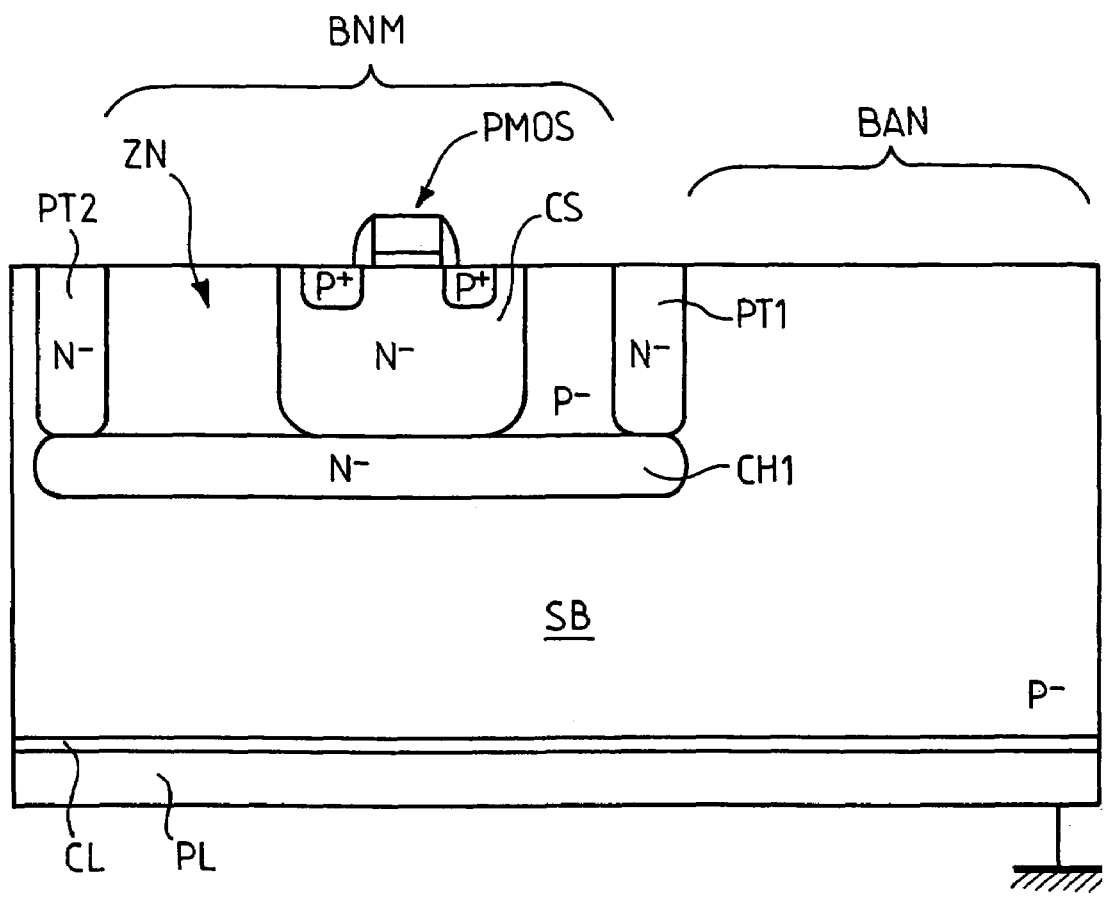
FIG. 5 diagrammatically illustrates a technological embodiment of a component according to the invention.

Technologically, the component CMP according to the invention is embodied, for example in 0.18 μm CMOS technology, on a monolithic substrate SB made of silicon, for example of $P^-$ type (FIG. 5).

To absorb the high-frequency current spikes, it is preferable to glue a metal plate PL onto the rear face of the substrate SB by means of a conventional conducting glue CL. This metal plate is intended to be grounded. The fine layer of oxide which forms naturally on the silicon of the substrate forms the dielectric of a capacitor whose two electrodes are formed respectively by the substrate SB and the metal plate PL. This capacitor, whose capacitance is relatively large, thus makes it possible to absorb the high-frequency current spikes.

Moreover, the digital part of the component CMP, that is to say in this instance the digital block BNM are made in a region ZN of the substrate which is insulated from the remainder of the substrate (in which region the analog part BAN of the component is made) by an $N^-$ doped semiconducting barrier formed here of a buried layer CH1 and two wells PT1 and PT2.

Moreover, the PMOS transistors of the digital part are made within an $N^-$ well which comes into contact with the buried layer CH1.

Also, in order to prevent the noise in the supply voltage Vdd from being transmitted via the $N^-$ wells to the analog part, so that it directly disturbs in particular the anti-aliasing filtering or else the amplifier LNA, it is advantageous to bias all the $N^-$ wells with a bias voltage different from that supplying the transistors situated in this insulated region ZN of the substrate.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An electronic component, comprising:
   an integrated circuit embodied on a single monolithic substrate and incorporating:
   a tuning circuit of the direct sampling type including mixed analog and digital circuitry configured to receive RF satellite digital television signals composed of several channels at a circuit input for direct sampling at RF and digital transposition to output several downconverted signals each associated with a different selected channel; and several channel decoding digital circuits connected at the outputs of the tuning circuit and each including digital circuitry to deliver respectively and simultaneously several streams of data packets corresponding to the different selected channels;

wherein the analog circuitry of the tuning circuit is fabricated in a first portion of that single monolithic substrate and digital circuitry of the tuning circuit and the several channel decoding circuits are fabricated in a second portion of that single monolithic substrate; and a semiconducting barrier formed in the single monolithic substrate between the first portion and the second portion to insulate the analog circuitry in the first portion from noise on a supply voltage for the digital circuitry in the second portion;

wherein the channels extend over a predetermined frequency span and the RF signals convey digital information coded by digital modulation, and wherein each channel decoding digital circuit comprises:
a low pass digital decimator filter followed by an additional digital filter for eliminating information of adjacent channels, the additional digital filter having a cutoff frequency of the order of the frequency half-width of a channel; and a digital error correction stage for delivering a stream of data packets corresponding to the information conveyed by the channel being processed by the channel decoding module.

2. The component according to claim 1, wherein the channels extend over a predetermined frequency span and the RF signals convey digital information coded by digital modulation, and
wherein the tuning circuit comprises:
an analog stage receiving the RF signals;
a multibit analog/digital conversion stage having a sampling frequency equal to at least twice the frequency span of the sampled RF signal; and
several digital devices for transposing frequencies that are connected to the output of the analog conversion stage, each digital device configured to separately deliver a sampled digital signal centered at the zero frequency and corresponding to the selected channel.

3. The component according to claim 1, further comprising:
a grounding metal plate glued to a rear face of the single monolithic substrate by a conducting glue to provide a high frequency current spike absorbing capacitor having a first plate formed of the substrate and a second plate formed of the metal plate with an oxide dielectric there between.

4. The component according to claim 1, wherein the substrate has a first type of conductivity and the digital circuitry of the tuning circuit and several channel decoding digital circuits are disposed in the second portion of the substrate that is insulated from the first portion of the substrate for the analog circuitry by the semiconducting barrier having a second type of conductivity different from the first type of conductivity, and wherein the semiconducting barrier is biased by a bias voltage different from the supply voltage for the digital circuitry.

5. The component of claim 1, wherein the electronic component comprises a satellite digital television signal receiver.

6. An electronic component, comprising:
an integrated circuit embodied on a single monolithic substrate and incorporating:
a tuning circuit of the direct sampling type including mixed analog and digital circuitry configured to receive RF satellite digital television signals composed of several channels at a circuit input for direct sampling at RF and digital transposition to output several downconverted signals each associated with a different selected channel; and several channel decoding digital circuits connected at the outputs of the tuning circuit and each including digital circuitry to deliver respectively and simultaneously several streams of data packets corresponding to the different selected channels;

wherein the analog circuitry of the tuning circuit is fabricated in a first portion of that single monolithic substrate and digital circuitry of the tuning circuit and the several channel decoding circuits are fabricated in a second portion of that single monolithic substrate; and a semiconducting barrier formed in the single monolithic substrate between the first portion and the second portion to insulate the analog circuitry in the first portion from noise on a supply voltage for the digital circuitry in the second portion;

wherein the channels extend over a predetermined frequency span and the RF signals convey digital information coded by digital modulation, and wherein the tuning circuit comprises:
an analog stage receiving the RF signals;
a multibit analog/digital conversion stage having a sampling frequency equal to at least twice the frequency span of the sampled RF signals; and
several digital devices for transposing frequencies that are connected to the output of the analog conversion stage, each digital device configured to separately deliver a sampled digital signal centered at the zero frequency and corresponding to the selected channel; and wherein each channel decoding digital circuit comprises:
a low pass digital decimator filter followed by an additional digital filter for eliminating information of adjacent channels, the additional digital filter having a cutoff frequency of the order of the frequency half width of a channel; and a digital error correction stage for delivering a stream of data packets corresponding to the information conveyed by the channel associated with the sampled digital signal processed by this channel decoding circuit.

7. The component according to claim 6, wherein the resolution of the analog/digital conversion stage is greater than or equal to 6 bits.

8. The component according to claim 6, wherein the decimator filter is a low-pass filter whose cutoff frequency is of the order of twice the frequency half-width of a channel, and wherein the cutoff frequency of the additional digital filter is of the order of the frequency half-width of a channel.

9. An integrated circuit, comprising:
a single monolithic substrate in which the following circuit components are provided:
an input receiving an RF analog signal including a plurality of channels;
an analog-to-digital converter to sample and convert the RF analog signal to a digital signal;
a first digital tuner that downconverts the digital signal to a first downconverted digital signal, wherein information of a selected first channel in the downconverted digital signal is centered at zero frequency;

a first channel decoding digital circuit connected to the first digital tuner that digitally decodes the first downconverted digital signal to output a stream of data packets for the selected first channel;

a second digital tuner that downconverts the digital signal to a second downconverted digital signal, wherein information of a selected second channel in the downconverted digital signal is centered at zero frequency; and a second channel decoding digital circuit connected to the second digital tuner that digitally decodes the second downconverted digital signal to output a stream of data packets for the selected second channel;

a grounding metal plate glued to a rear face of the single monolithic substrate by a conducting glue to provide a high frequency current spike absorbing capacitor having a first plate formed of the substrate and a second plate formed of the metal plate with an oxide dielectric there between;

wherein circuitry of the converter, tuners and channel decoding digital circuits are fabricated on that single monolithic substrate.

10. The circuit of claim 9 wherein the first and second digital tuners perform frequency transposition and channel selection in a digital domain.

11. The circuit of claim 9 wherein the analog-to-digital converter oversamples the received RF analog signal.

12. The circuit of claim 9 wherein the RF analog signal conveys information for the plurality of channels by digital modulation.

13. The circuit of claim 9 wherein the channels of the RF analog signal extend over a frequency span and wherein the analog-to-digital converter oversamples the received RF analog signal at a sampling frequency at least twice the frequency span.

14. The circuit of claim 13 wherein the RF analog signal comprises a satellite digital television analog signal.

15. The circuit of claim 9 wherein each of the decoding digital circuits comprises:
a decimator filter that filters the downconverted digital signal to output digital signals relating to the selected channel and adjacent channel information;
a digital filter that filters out the adjacent channel information; and
an error correction stage to produce the data packets from the selected channel information.

16. The circuit of claim 15 wherein the decimator filter is a low pass filter having a cut-off frequency approximately equal to twice a frequency half width of a channel.

17. The circuit of claim 16 wherein the first and second channel decoding digital circuits each include a digital filter that filters out the adjacent channel information and is a Nyquist filter having a cut-off frequency approximately equal to the frequency half width of the channel.

18. The circuit of claim 9 wherein the integrated circuit is a component within a satellite digital television signal receiver.

19. An integrated circuit, comprising:
a single monolithic substrate in which the following circuit components are provided:
an input receiving an RF analog signal including a plurality of channels;
a first analog-to-digital converter to sample and convert the RF analog signal to a first digital signal;
a second analog-to-digital converter to sample and convert the RF analog signal to a second digital signal;
a first digital tuner that downconverts a received digital signal to a first downconverted digital signal, wherein information of a selected first channel in the downconverted digital signal is centered at zero frequency;
a first channel decoding digital circuit connected to the first digital tuner that decodes the first downconverted digital signal to output a stream of data packets for the selected first channel;
a second digital tuner that downconverts a received digital signal to a second downconverted digital signal, wherein information of a selected second channel in the downconverted digital signal is centered at zero frequency;
a second channel decoding digital circuit connected to the second digital tuner that decodes the second downconverted digital signal to output a stream of data packets for the selected second channel; and
a switching circuit that selectively couples the first and second digital signals output from the first and second converters to the first and second digital tuners;
each of the first and second channel decoding circuits including a digital filter that filters out the adjacent channel information, that digital filter being a Nyquist filter having a cut-off frequency approximately equal to the frequency half width of the channel;
wherein the converters, tuners, channel decoding digital circuits and switching circuit are fabricated on that single monolithic substrate;
wherein each of the decoding digital circuits comprises:
a decimator filter that filters the downconverted digital signal to output digital signals relating to the selected channel and adjacent channel information; and
an error correction stage to produce the data packets from the selected channel information;
wherein the decimator filter is a low pass filter having a cut-off frequency approximately equal to twice a frequency half width of a channel.

20. The circuit of claim 19 wherein the first analog-to-digital converter is associated with RF analog signals in a first passband and wherein the second analog-to-digital converter is associated with RF analog signals in a second passband.

21. The circuit of claim 20 wherein, if the first and second channels are located in the first passband, the switching circuit selectively couples the first and second digital tuners to the first analog-to-digital converter.

22. The circuit of claim 20 wherein, if the first and second channels are located in the second passband, the switching circuit selectively couples the first and second digital tuners to the second analog-to-digital converter.

23. The circuit of claim 20 wherein, if the first channel is located in the first passband and the second channel is located in the second passband, the switching circuit selectively couples the first digital tuner to the first analog-to-digital converter and the second digital tuner to the second analog-to-digital converter.

24. The circuit of claim 20 wherein, if the first channel is located in the second passband and the second channel is located in the first passband, the switching circuit selectively couples the first digital tuner to the second analog-to-digital converter and the second digital tuner to the first analog-to-digital converter.

25. The circuit of claim 20 further including:
a first filter tuned to the first passband that outputs the RF analog signal to the first analog-to-digital converter; and
a second filter tuned to the second passband that outputs the RF analog signal to the second analog-to-digital converter.

26. The circuit of claim 19 wherein the first and second digital tuners perform frequency transposition and channel selection in a digital domain.

27. The circuit of claim 19 wherein each analog-to-digital converter oversamples the received RF analog signal.

28. The circuit of claim 19 wherein the RF analog signal conveys information for the plurality of channels by digital modulation.

29. The circuit of claim 19 wherein the channels of the RF analog signal applied to each analog-to-digital converter extend over a given frequency span and wherein each analog-to-digital converter oversamples the received RF analog signal at a sampling frequency at least twice the given frequency span.

30. The circuit of claim 29 wherein the RF analog signal comprises a satellite digital television analog signal.

31. An integrated circuit comprising:
a single monolithic substrate in which the following circuit components are provided:
an input receiving an RF analog signal including a plurality of channels;
a first analog-to-digital converter to sample and convert the RF analog signal to a first digital signal;
a second analog-to-digital converter to sample and convert the RF analog signal to a second digital signal;
a first digital tuner that downconverts a received digital signal to a first downconverted digital signal, wherein information of a selected first channel in the downconverted digital signal is centered at zero frequency;
a first channel decoding digital circuit connected to the first digital tuner that decodes the first downconverted digital signal to output a stream of data packets for the selected first channel;
a second digital tuner that downconverts a received digital signal to a second downconverted digital signal, wherein information of a selected second channel in the downconverted digital signal is centered at zero frequency;
a second channel decoding digital circuit connected to the second digital tuner that decodes the second downconverted digital signal to output a stream of data packets for the selected second channel; and
a switching circuit that selectively couples the first and second digital signals output from the first and second converters to the first and second digital tuners;
each of the first and second channel decoding circuits including a digital filter that filters out the adjacent channel information, that digital filter being a Nyquist filter having a cut-off frequency approximately equal to the frequency half width of the channel;
wherein the converters, tuners, channel decoding digital circuits and switching circuit are fabricated on that single monolithic substrate;
further comprising a metal plate attached to a rear surface of the single monolithic substrate to provide a high frequency current spike absorbing capacitor having a first plate formed of the substrate and a second plate formed of the metal plate with an oxide dielectric there between.

32. The circuit of claim 31 wherein the integrated circuit is a component within a satellite digital television signal receiver.

33. An electronic circuit, comprising:
an integrated circuit embodied on a single monolithic substrate and incorporating:
a multi-channel direct sampling type tuner circuit that receives an RF analog signal composed of several channels and outputs first and second channel digital signals, the tuner circuit including analog filtering circuitry and digital conversion and tuning circuitry;
a first channel decoder circuit that receives the first channel digital signal and outputs a first channel stream of data packets; and
a second channel decoder circuit that receives the second channel digital signal and outputs a second channel stream of data packets;
wherein the analog filtering circuitry of the tuner circuit is fabricated in a first portion of that single monolithic substrate and digital circuitry of the tuner circuit and the first and second channel decoder circuits are fabricated in a second portion of that single monolithic substrate; and
a semiconducting barrier formed in the single monolithic substrate between the first portion and the second portion to insulate the analog circuitry in the first portion from noise on a supply voltage for the digital circuitry in the second portion;
wherein each of the channel decoder circuits comprises:
a decimator filter that filters the downconverted digital signal to output digital signals relating to the selected channel and adjacent channel information;
a digital filter that filters out the adjacent channel information; and
an error correction stage to produce the data packets from the selected channel information;
wherein the decimator filter is a low pass filter having a cut-off frequency approximately equal to twice a frequency half width of a channel.

34. The circuit of claim 33 wherein the multi-channel direct sampling type tuner circuit comprises:
at least one analog-to-digital converter to convert the received RF analog signal to a digital signal;
a first digital domain frequency transposition circuit that downconverts the digital signal to the first channel digital signal; and
a second digital domain frequency transposition circuit that downconverts the digital signal to the second channel digital signal.

35. The circuit of claim 34 wherein the multi-channel direct sampling type tuner circuit comprises a first and second analog-to-digital converter that convert the received RF analog signal to a first and second digital signal, and a switching circuit that selectively couples the first and second digital signals to the first and second digital domain frequency transposition circuits.

36. The circuit of claim 35 wherein the first analog-to-digital converter is associated with RF analog signals in a first passband and wherein the second analog-to-digital converter is associated with RF analog signals in a second passband.

37. The circuit of claim 36 wherein, if the first and second channels are located in the first passband, the switching circuit selectively couples the first and second digital domain frequency transposition circuits to the first analog-to-digital converter.

38. The circuit of claim 36 wherein, if the first and second channels are located in the second passband, the switching circuit selectively couples the first and second digital domain frequency transposition circuits to the second analog-to-digital converter.

39. The circuit of claim 36 wherein, if the first channel is located in the first passband and the second channel is located in the second passband, the switching circuit selectively couples the first digital domain frequency transposition circuit to the first analog-to-digital converter and the second digital domain frequency transposition circuit to the second analog-to-digital converter.

40. The circuit of claim 36 wherein, if the first channel is located in the second passband and the second channel is located in the first passband, the switching circuit selectively couples the first digital domain frequency transposition circuit to the second analog-to-digital converter and the second digital domain frequency transposition circuit to the first analog-to-digital converter.

41. The circuit of claim 36 further including:
a first filter tuned to the first passband that outputs the RF analog signal to the first analog-to-digital converter; and
a second filter tuned to the second passband that outputs the RF analog signal to the second analog-to-digital converter.

42. The circuit of claim 33 wherein the analog-to-digital converter oversamples the received RF analog signal.

43. The circuit of claim 33 wherein the RF analog signal conveys information for the plurality of channels by digital modulation.

44. The circuit of claim 33 wherein the channels of the RF analog signal extend over a frequency span and wherein the analog-to-digital converter oversamples the received RF analog signal at a sampling frequency at least twice the frequency span.

45. The circuit of claim 44 wherein the RF analog signal comprises a satellite digital television analog signal.

46. The circuit of claim 33 wherein each of the channel decoder circuits includes a digital filter that filters out the adjacent channel information and is a Nyquist filter having a cut-off frequency approximately equal to the frequency half width of the channel.

47. The circuit of claim 33 further comprising a metal plate attached to a rear surface of the single monolithic substrate to provide a high frequency current spike absorbing capacitor having a first plate formed of the substrate and a second plate formed of the metal plate with an oxide dielectric there between.

48. The circuit of claim 33 wherein the integrated circuit is a component within a satellite digital television signal receiver.

* * * * *

UNITED STATES PATENT AND TRADEMARK OFFICE
CERTIFICATE OF CORRECTION

PATENT NO.      : 7,643,634 B2                                  Page 1 of 1
APPLICATION NO. : 10/814818
DATED           : January 5, 2010
INVENTOR(S)     : Busson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Sixteenth Day of November, 2010

David J. Kappos
*Director of the United States Patent and Trademark Office*